United States Patent [19]

Hino et al.

[11] Patent Number: 5,231,271
[45] Date of Patent: Jul. 27, 1993

[54] MANAGEMENT METHOD OF PRINTED CIRCUIT BOARDS IN ASSEMBLING PROCESS AND MANAGEMENT SYSTEM THEREFOR

[75] Inventors: Toshikatsu Hino; Nobukatsu Wakabayashi, both of Oyama; Koji Kobayashi, Kawauchi; Kazuhide Toyoda, Yuki, all of Japan

[73] Assignee: Fujitsu Limited, Kawasaki, Japan

[21] Appl. No.: 709,516

[22] Filed: Jun. 3, 1991

[30] Foreign Application Priority Data

Jun. 6, 1990 [JP] Japan .................. 2-148035

[51] Int. Cl.⁵ .............................. G06F 15/20
[52] U.S. Cl. .................. 235/375; 235/376; 235/385
[58] Field of Search ................ 235/385, 375, 376

[56] References Cited

U.S. PATENT DOCUMENTS 5,032,707 7/1991 Gudmundson .................. 235/375

FOREIGN PATENT DOCUMENTS

60-171904 9/1985 Japan .
60-262702 12/1985 Japan .
2-74100 3/1990 Japan .

Primary Examiner—Harold Pitts
Attorney, Agent, or Firm—Armstrong, Westerman, Hattori, McLeland & Naughton

[57] ABSTRACT

Finished printed circuit boards and their identity data are stored in an automatic warehouse and in a stock file, respectively. It is determined whether all necessary printed circuit boards inserted into the shelf of an electronic apparatus are stored in the automatic warehouse by examining the identity data of the printed circuit boards, and if the all necessary printed circuit boards are found to be stored in the automatic warehouse, the identity data of all the necessary printed circuit boards are stored in a delivery file, and the printed circuit boards are delivered according to contents of the delivery file. Employing this method, an amount of "goods in process" and their retention time are decreased, and information about individual parts used in a dispatched apparatus is easily obtained.

16 Claims, 7 Drawing Sheets

MANAGEMENT METHOD OF PRINTED CIRCUIT BOARDS IN ASSEMBLING PROCESS AND MANAGEMENT SYSTEM THEREFOR

BACKGROUND OF THE INVENTION

1. Field of the Invention

The present invention relates to a management method of printed circuit boards in an assembling process of various types of electronic apparatuses having different arrangements of the printed circuit boards, and a management system for carrying out the method.

2. Description of the Related Art

Generally, an assembling process of electronic apparatuses having a plurality of printed circuit boards comprises assembling and testing steps of the printed circuit boards, and assembling and testing steps of the apparatuses on which the printed circuit boards have been mounted. In the case where various types of electronic apparatuses are assembled, the printed circuit boards produced in the former steps are stocked in a warehouse to synchronize with the latter steps.

Conventionally, the printed circuit boards which have been assembled and which have passed the test are put into a carrying box in such a manner that one carrying box contains the same type of printed circuit boards. The carrying box usually contains ten or twenty printed circuit boards of the same type. The carrying box containing the printed circuit boards is carried to the warehouse and the printed circuit boards are stocked in the carrying box on a shelf of the warehouse.

A printed circuit board which is used in the assembling steps of the apparatus is taken out of the warehouse while in the carrying box with other printed circuit boards of the same type, and is inserted into a given slot of a shelf of a rack for the apparatus.

In the aforementioned process, a sufficient amount of "goods in process", i.e. the finished printed circuit boards and racks, and sufficient retention time of the goods in process, is necessary for facilitating the assembling process. In addition, it is not easy to recognize whether all of the necessary printed circuit boards for assembling an apparatus are stocked in the warehouse, and much time and labor is required for gathering all of the necessary printed circuit boards. Namely, "board arrangement" is not easy.

In addition, it has been more important to identify the places where individual parts, especially large scale integrated circuits (LSI), mounted on the printed circuit boards, have been shipped to, in order to promptly take the necessary countermeasures against using formerly defective parts in the apparatus. To identify the location of the individual parts, it is necessary to record the types of the apparatus which are shipped and the production numbers or lot numbers of the individual parts mounted on the individual printed circuit boards used in the individual apparatuses. In the aforementioned process, however, recording this information is troublesome.

SUMMARY OF THE INVENTION

It is an object of the present invention to provide a management method for printed circuit boards in an assembling process wherein an amount of "goods in process" and retention time thereof can be minimized.

It is another object of the present invention to provide a management method wherein the aforementioned "board arrangement" is easily performed.

It is still another object of the present invention to provide a management method wherein information about individual parts used in a dispatched apparatus can be easily obtained.

It is yet another object of the present invention to provide a management system for carrying out the aforementioned management method.

DESCRIPTION OF THE PREFERRED EMBODIMENTS

Figure 1:
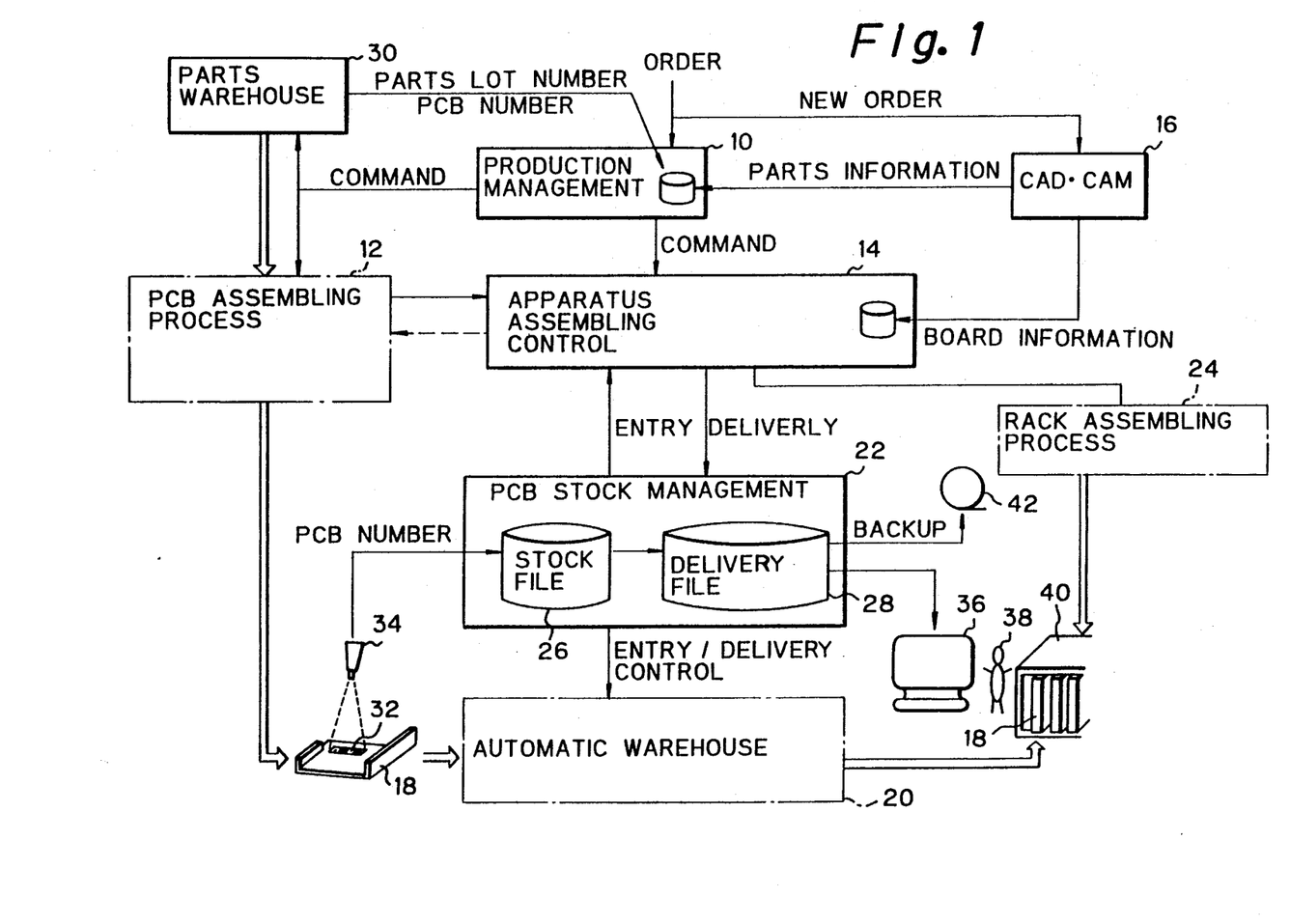
FIG. 1 is a schematic diagram of a manufacturing system of electronic apparatuses according to an embodiment of the present invention.

FIG. 1 is a schematic diagram of a manufacturing system of electronic apparatuses according to an embodiment of the present invention.

A production management system 10 manages a printed circuit board (referred to hereinafter as PCB) assembling process 12 and an apparatus assembling process controlled by an apparatus assembling control system 14, in accordance with production planning. A CAD.CAM system 16 provides information about necessary PCB's for assembling an apparatus and parts mounted on the PCB's for the production management system 10, when a new apparatus is ordered. The CAD.CAM system 16 also provides information about the arrangement of PCB's in the apparatus for the apparatus assembling control system 14, when the new apparatus is ordered. The apparatus assembling control system 14 monitors entry of the finished PCB's 18 into an automatic warehouse 20 which is managed by a PCB stock management system 22, and controls the PCB stock management system 22 so as to deliver the PCB's 18 from the automatic warehouse 20. The apparatus assembling control system 14 also controls a rack assembling process 24 so as to assemble racks in adequate time. The PCB stock management system 22 comprises a stock file 26 and a delivery file 28. PCB numbers of PCB's stocked in the automatic warehouse 20 and their stock positions are stored in the stock file 26. PCB numbers of delivered PCB's are stored in the delivery file 28. The PCB stock management system 22 also comprises many sequence controllers (not shown) to control carrier apparatuses and robots in the automatic warehouse 20.

In accordance with a customer's order, the raw PCB's and parts out of a parts warehouse 30 and issues commands for the assembly of PCB's to the PCB assembling process 12. A PCB number is given to each PCB in the form of a bar code. The PCB number and lot numbers of the parts mounted on the raw PCB are stored in a storage unit of the production management system 10.

An assembled PCB 18 is carried to an inlet of the automatic warehouse 20 and the bar code 32 appended to the PCB 18 is read out by a bar code reader 34 to recognize its PCB number. The PCB stock management system 22 determines a suitable storage position for the PCB by considering its height as determined from the PCB number and controls the automatic warehouse 20 to assist in stocking the PCB. The PCB number of the PCB is stored with storage position information in a stock file 26 of the PCB stock management system 22. The entry of the PCB and its PCB number are recorded in the apparatus assembling control system 14.

The production management system 10 also issues commands to assemble the apparatus to the apparatus assembling control system 14. The apparatus assembling control system 14 controls the rack assembling process 24 so that racks for the apparatus are assembled in adequate time. The apparatus assembling control system 14 examines whether the PCB's required in the arrangement of PCB's in the apparatus are stocked in the automatic warehouse 20. If all of the required PCB's are stocked, the apparatus assembling control system 14 issues commands to deliver the required PCB's to the PCB stock management system 22. Then, inserting positions and PCB numbers of the required PCB's are stored in a delivery file 28 of the PCB stock management system 22, and the inserting positions are displayed on a display terminal 36. The required PCB's are carried to an outlet of the automatic warehouse 20. A worker 38 inserts the PCB's 18 into given slots of a shelf 40 of the rack after looking at the display terminal 36.

The contents of the delivery file 28 is copied on a magnetic tape 42. The lot numbers of the individual parts used in each product can be identified by combining the information stored in the magnetic tape 42 with the information stored in the production management system 10.

Figure 2:
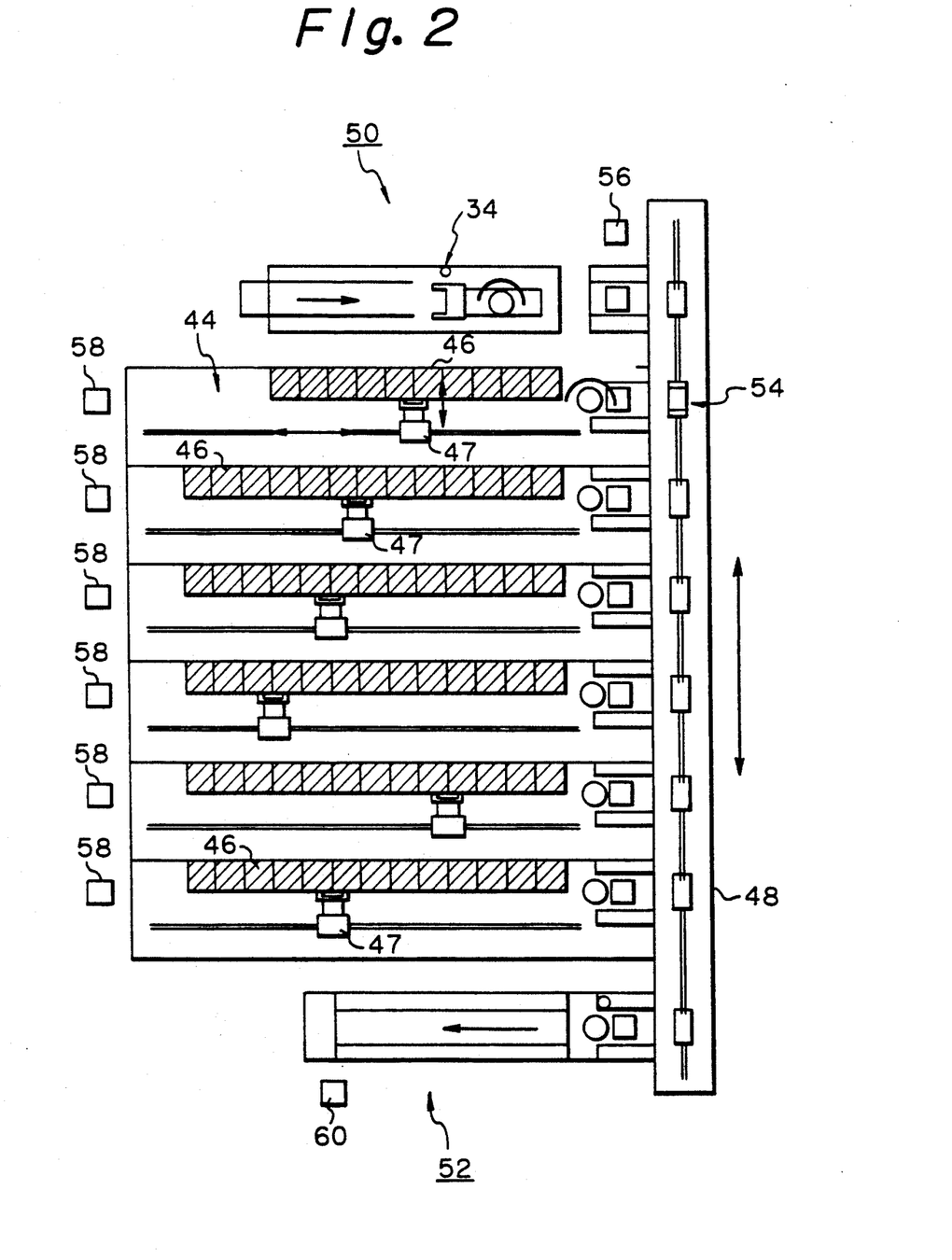
FIG. 2 is a plan view of an automatic warehouse shown in FIG. 1.

FIG. 2 is a plan view of the automatic warehouse 20 of FIG. 1. The bar code reader 34 was explained before. A storage part 44 comprises a plurality of lines of storage units 46 which have many-layered storage slots. Robots 47 takes the PCB in and out of the storage units 46. A linear carrier 48 driven by a linear motor is between an entry part 50 and the storage part 44 and between the storage part 44 and a delivery part 52. The entered or delivered PCB is contained in a carrier case 54 which is carried by the linear carrier 48. Apparatuses in each part are controlled by an entry personal computer 56, storage personal computers 58, and a control personal computer 60. All of the personal computers 56, 58, and 60 are combined by a local area network (LAN), and perform the entry and delivery operation of the PCB in parallel and cooperating with each other, by communicating messages to each other.

Figure 3A:
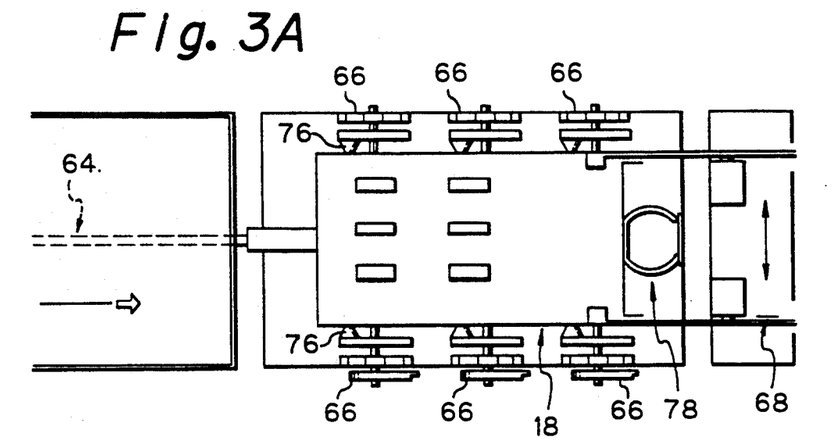
FIGS. 3A to 3C are diagrams showing the main portion of an entry part of the automatic warehouse.
Figure 3B:
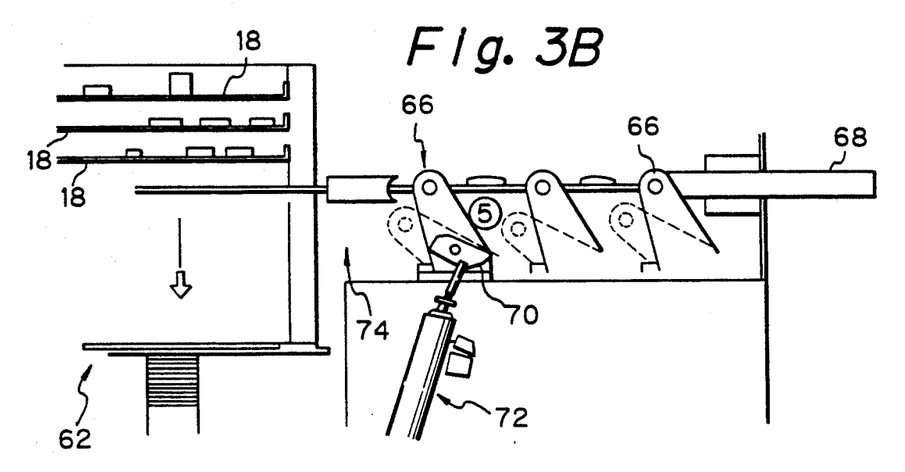
Figure 3C:
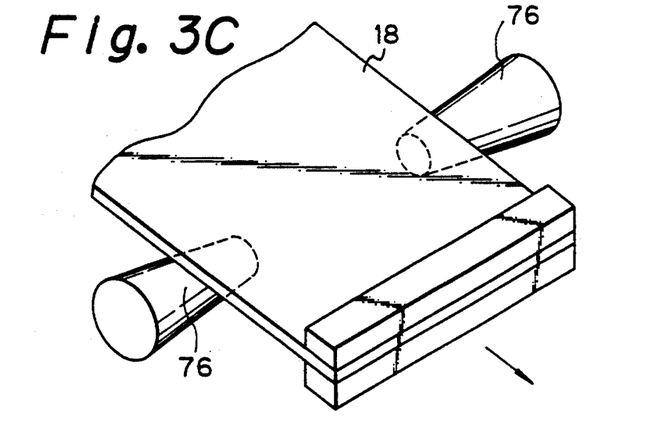

FIG. 3A to 3C show the main portion of an example of the entry part 50 of the automatic warehouse 20. FIG. 3A is a plan view of the main portion, FIG. 3B is a side view of the main portion, and FIG. 3C is a perspective view of the main portion of a board supporter.

In FIG. 3A to 3C, the reference numeral 18 denotes the PCB, the reference numeral 62 denotes a lifter to adjust the elevation of the PCB 18 which is moved by a pusher 64, the reference numeral 66 denotes a board supporter to support both sides of the pushed-out PCB from the lower side, the reference numeral 68 denotes a manipulator hand to grasp a leading edge of the pushed-out PCB to put the PCB into the carrying case 54, the reference numeral 70 denotes a bell crank, the reference numeral 72 denotes an air cylinder, the reference numeral 74 denotes a sensor, and the reference numeral 76 denotes a tapered roll.

Stand-by positions of the board supporters 66 are represented by broken curves in FIG. 3B. If the leading edge of the PCB 18 which is pushed-out by the pusher 64 is sensed by the sensor 74, the board supporters 66 are raised by the air cylinder 72 and the bell crank 70, as shown in FIG. 3B. Then, the tapered rolls 76 comprised in the board supporters 66 supports the PCB 18 from the lower side, as shown in FIG. 3C. The PCB 18 is stopped by a spring 78 pushing the leading edge of the PCB 18, and thereby a horizontal position of the PCB 18 is defined. Irregularities of the whole PCB are absorbed by using the spring 78.

The aforementioned structure of the board supporter 66 avoids obstruction over the moving PCB 18 from any projection existing in the leading edge of the PCB 18. The taper of the tapered roll 76 guides the moving PCB 18 toward a normal position while the PCB 18 is supported on the board supporters 66.

Figure 4:
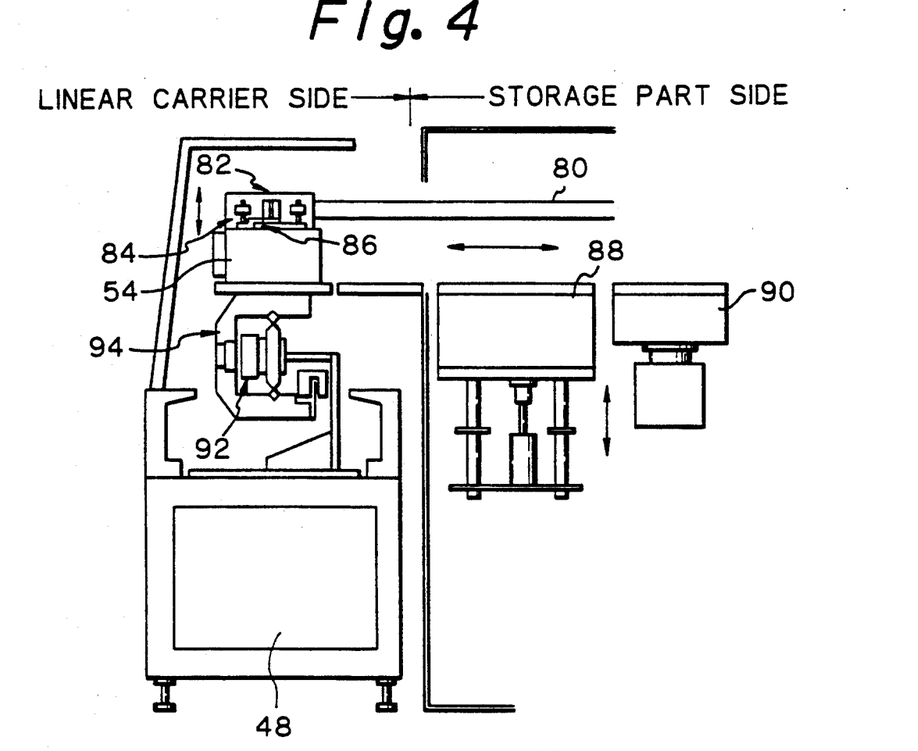
FIG. 4 is a diagram showing the construction of a main portion of a storage area of the automatic warehouse.
Figure 5A:
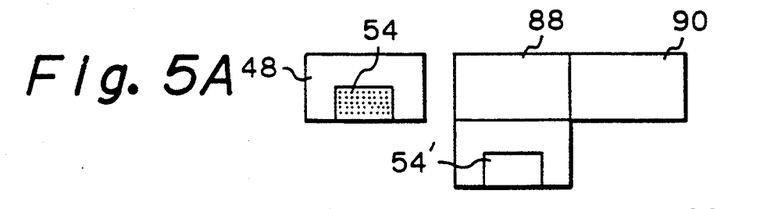
FIGS. 5A to 5C are diagrams for explaining the role of a buffer as shown in FIG. 4.
Figure 5B:
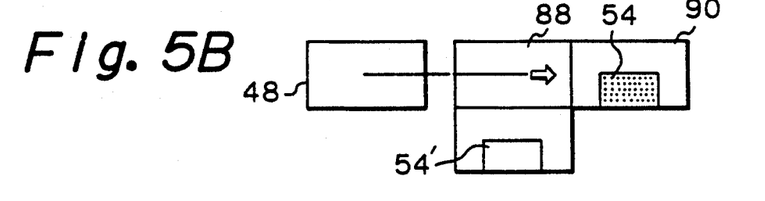
Figure 5C:
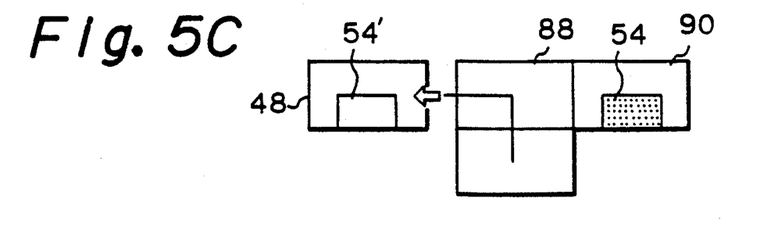

FIG. 4 is a diagram showing the construction of the main portion of the storage part 44, and FIGS. 5A to 5C are diagrams for explaining the role of a buffer shown in FIG. 4.

A moving arm 80 catches the carrying case 54 carried by the linear carrier 48 with a catching part 82 and moves the carrying case 54 into the storage part 44 (FIG. 2). The catching part 82 has a vertical cylinder 84 to move the catched carrying case 54 up and down, and a projection 86 to catch the carrying case 54. The reference numeral 88 denotes a buffer wherein an empty carrying box 54' stands by, the reference numeral 90 denotes a rotary cylinder to rotate the carrying case 54, and the reference numeral 92 and 94 denote a linear motor and its carrier, respectively.

As shown in FIG. 5A, when the carrying case 54 carried by the linear carrier 48 arrives at a predetermined line of the storage part 44, the moving arm 80 catches the carrying case 54 and horizontally draws the carrying case 54 to the rotary cylinder 90, as shown in FIG. 5B. After that, while the carrying case 54 is handled by the robot 47 (FIG. 2) inside the automatic warehouse, the empty carrying case 54' which has stood by at the buffer 88 is returned to the linear carrier 48 and is returned to the entry part 50 (FIG. 2).

In this manner, the empty carrying case can be quickly returned to the entry part to start the next operation, and the relatively slow operation of the robot is allowed in the storage part.

Figure 6:
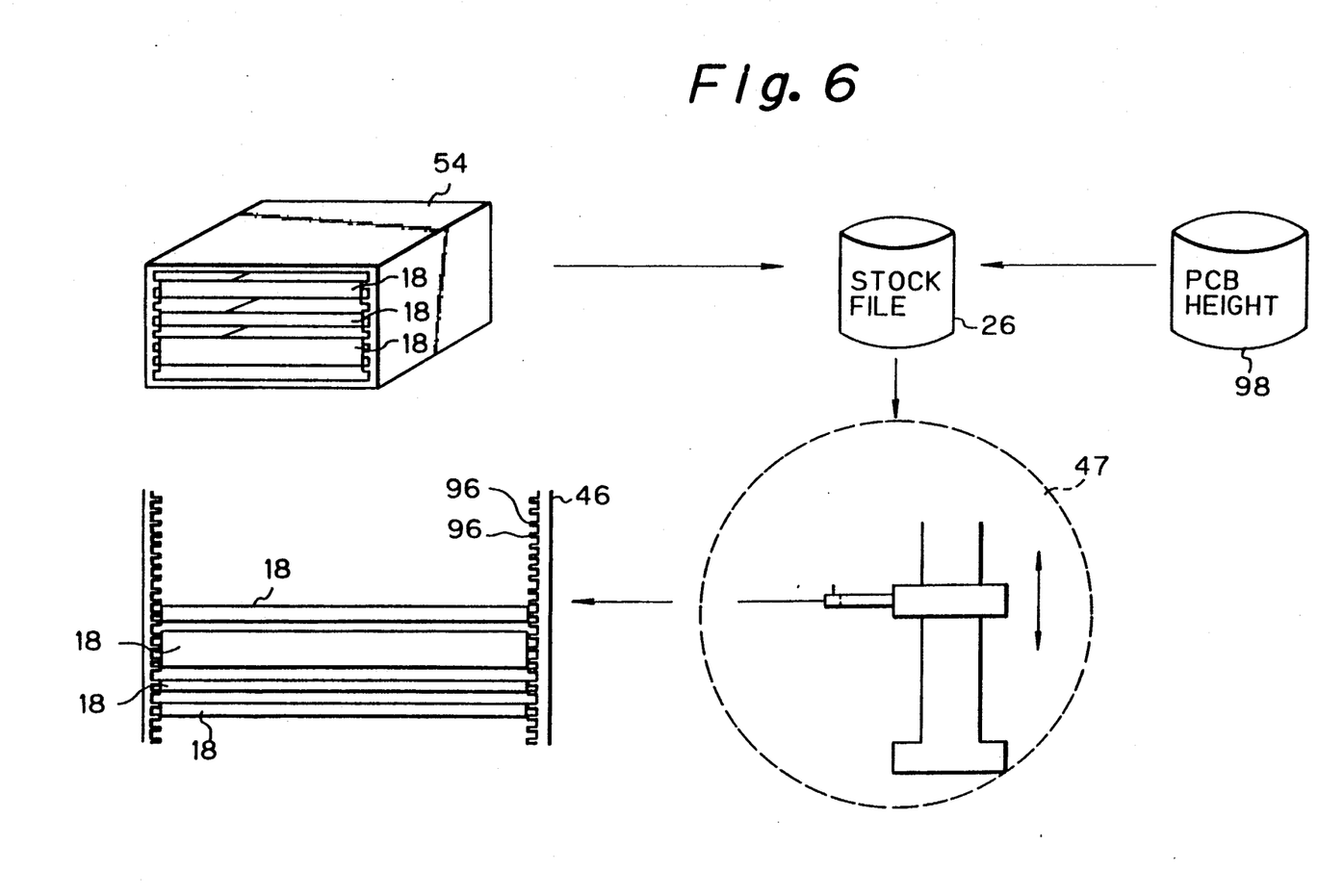
FIG. 6 is a diagram for explaining an operation of a robot and the structure of a storage unit.

FIG. 6 is a diagram for explaining an operation of the robot 47 and a structure of the storage unit 46.

The PCB 18 has, for example, five heights (thickness), i.e., 0.5, 1.0, 1.5, 2.0, and 2.5. Therefore, the storage unit 46 has storage slots at intervals of 0.5 which is the greatest common divisor of the five heights. As types of the PCB's 18 carried in the carrying case 54 can be recognized from the bar code 32 (FIG. 1) appended to each PCB 18, heights of the PCB's 18 can also be recognized based on PCB height information stored in a PCB height file 98. Storage positions of the PCB's 18 are determined from the height of PCB's and the information stored in the stock file 26. The height of the robot 47 is adjusted according to the PCB height and the storage positions.

The storage position of the PCB's 18 are determined by successively searching the content of the stock file 26 until a space where all of the PCB's 18 contained in the carrying case 54 can be stocked is found. If that space is not found, the PCB's are stocked separately.

Figure 7:
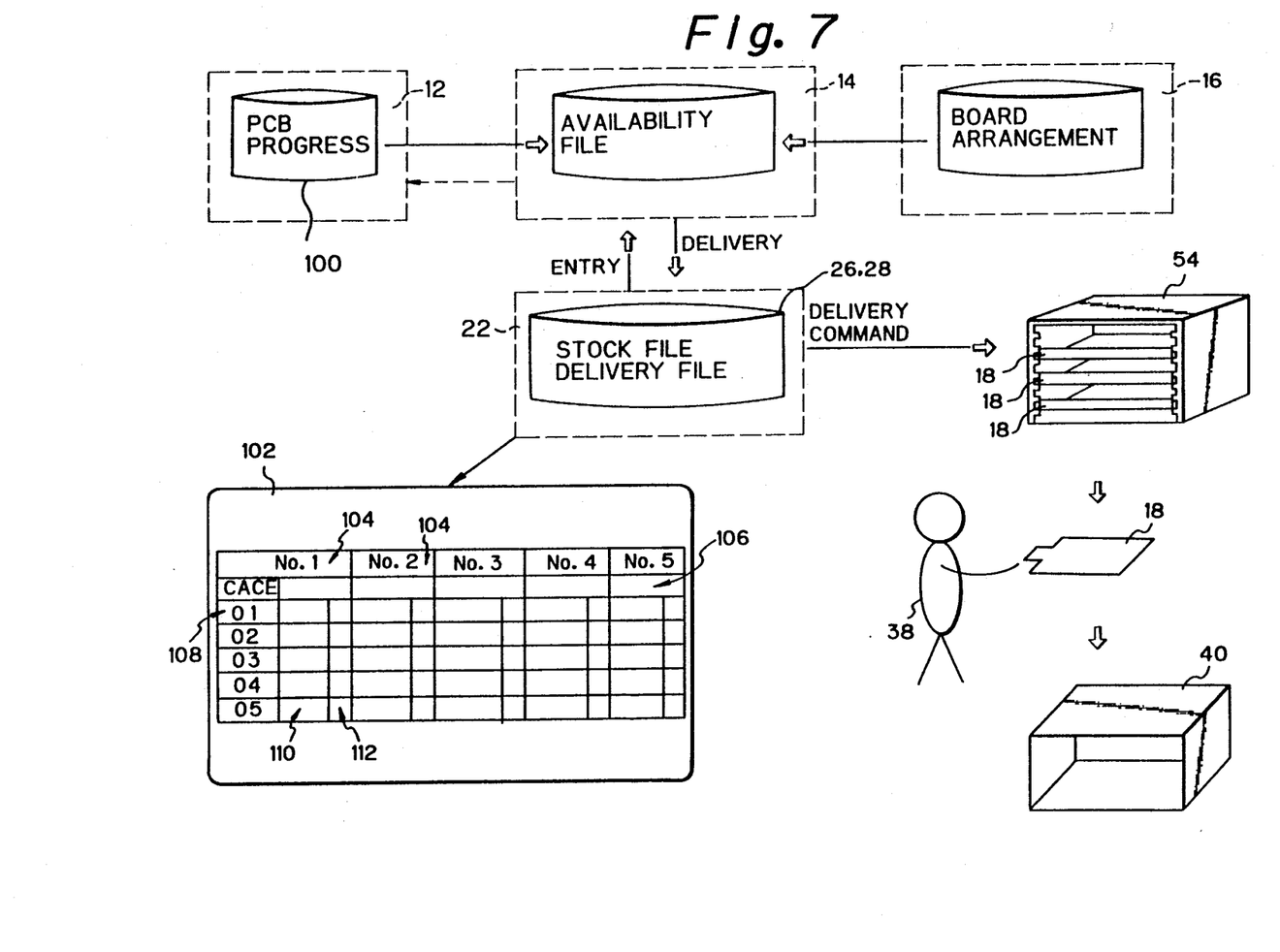
FIG. 7 is a diagram for explaining delivery operations.

FIG. 7 is a diagram explaining delivery operations.

The progress of the assembling of PCB's in the PCB assembling process 12 is stored in a PCB progress file 100. The apparatus assembling control system 14 watches not only the entry of the PCB's in the stock file 26 as mentioned above but also the progress of PCB's in the PCB assembling process 12. If an ill-progressing PCB is found among an arrangement of an apparatus, the apparatus assembling control system 14 issues command to outstrip other PCB's to the PCB assembling process 12.

As mentioned above, the apparatus assembling control system 14 examines availability of all of PCB's used in apparatus in the board arrangement process, and if all PCB's are available in the automatic warehouse 20, the apparatus assembling control system 14 issues command to deliver the PCB's to the PCB stock management system 22. Then the PCB's 18 contained in the carrying case 54 are carried to the delivery part 52 (FIG. 2).

In FIG. 7, the reference numeral 102 denotes a table displayed on a display screen of the display terminal 36 (FIG. 1). In this table, the reference numerals 104, 106, 108, 110, and 112 denote numbers of shelves in an apparatus or apparatuses, names of the shelves, numbers of carrying cases, names of PCB's, and mounting positions of the PCB's respectively. Looking at table 102, the worker 38 inserts the PCB's 18 into given slots of the shelf 40. This inserting process may be automated by employing a suitably designed robot.

Figure 8:
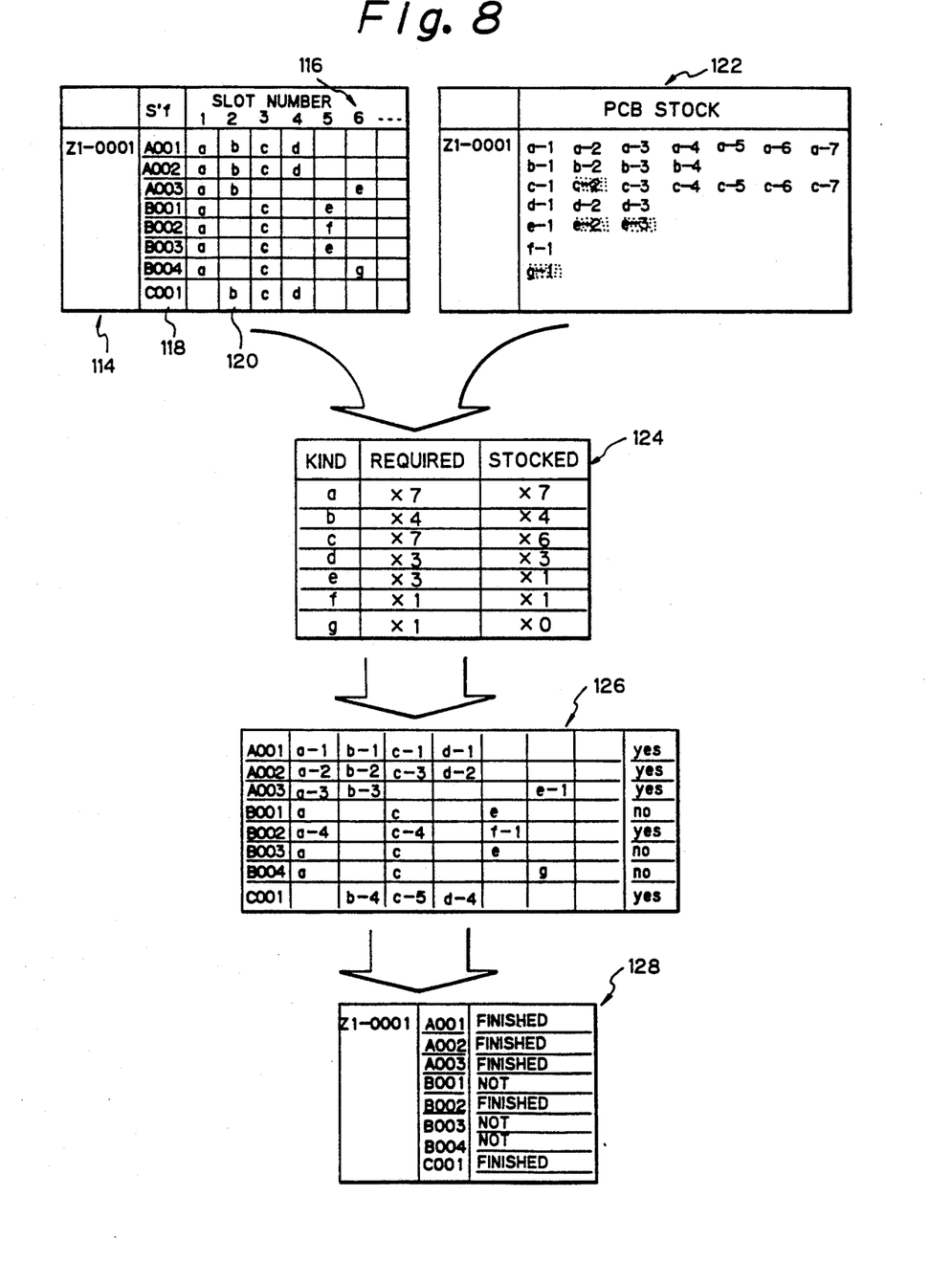
FIG. 8 is a diagram for explaining a "board arrangement" process.

FIG. 8 is a diagram for explaining the "board arrangement" process conducted in the apparatus assembling control system 14. In FIG. 8, board mounting information given by the CAD.CAM system 16 (FIG. 1) regarding an apparatus is represented in the form of table 114. The reference numerals 116, 118, and 120 denote shelf slot number, shelf number, and kind of board, respectively. Board stock information for the apparatus is represented in the form of table 122. In this example, though seven PCB-a's, four PCB-b's, etc. are required, c-2, e-2, e-3, and g-1 are not stocked because they could not pass the test.

The table 124 represents the number of required PCB's and stocked PCB's. The table 124 shows that one PCB-c, two PCB-e's, and one PCB-g are missing.

The table 126 represents the assignment of each PCB to each shelf. The PCB's a-1, b-1, c-1, and d-1are assigned to the shelf A001, the PCB's a-2, b-2, c-3 (because c-2 is not available), and d-2 are assigned to the shelf A002, the PCB's a-3, b-3and e-1 are assigned to the shelf A003, no PCB is assigned to the shelf B001 because kind e is not available, the PCB's a-4, c-4 and f-1 are assigned to the shelf B002, ..., and the PCB's b-4, c-5, and d-4 are assigned to the shelf C001.

The table 128 represents board arrangement completion for each shelf. Only PCB's corresponding to the finished shelf are carried to the delivery part 52 (FIG. 2).

Though, in the aforementioned embodiment, the automatic warehouse 20 has a single linear carrier to perform entry and delivery operations, the automatic warehouse 20 may have two carrier means which independently perform the entry operation and the delivery operation.

We claim:

1. A management method of printed circuit boards in an assembling process of electronic apparatuses having a shelf or a plurality of shelves wherein a plurality of the printed circuit boards are inserted, comprising the steps of:
   i) reading identity codes appended to the printed circuit boards;
   ii) storing identity data of the printed circuit boards derived from the identity codes, in a stock file;
   iii) automatically storing the printed circuit boards in an automatic warehouse;
   iv) examining whether all necessary printed circuit boards inserted into a shelf of the electronic apparatus are stored in the automatic warehouse by examining the identity data of the printed circuit boards;
   v) storing the identity data of all the necessary printed circuit boards in a delivery file, if all the necessary printed circuit boards are found to be stored in the automatic warehouse in the step iv); and
   vi) automatically delivering the printed circuit boards according to the contents of the delivery file.

2. A management method as claimed in claim 1, further comprising the step of storing the identity code of individual parts mounted on the individual printed circuit boards in a storage.

3. A management method as claimed in claim 1, wherein the identity codes are bar code appended to the printed circuit boards, and in step i) the bar codes are read by a bar code reader.

4. A management system of printed circuit boards in an assembling process of electronic apparatuses having a shelf or a plurality of shelves wherein a plurality of the printed circuit boards are inserted, comprising;
   means for reading identity codes appended to the printed circuit boards;
   means for storing identity data of the printed circuit boards derived from the identity codes, in a stock file;
   means for automatically storing the printed circuit boards in an automatic warehouse;
   means for examining whether all necessary printed circuit boards inserted into a shelf of the electronic apparatus are stored in the automatic warehouse by examining the identity data of the printed circuit boards;
   means for storing the identity data of all the necessary printed circuit boards in a delivery file, if all the necessary printed circuit boards are found to be stored in the automatic warehouse in the examining means; and
   means for automatically delivering the printed circuit boards according to the contents of the delivery file.

5. A management system as claimed in claim 4, further comprises means for storing the identity code of individual parts mounted on the individual printed circuit boards in a storage.

6. A management system as claimed in claim 4, wherein the identity codes are bar code appended to the printed circuit boards, and the reading means is a bar code reader.

7. The method of claim 1, wherein said step (iii) includes providing a plurality of robots and a plurality of lines of storage units, said robots being capable of moving printed circuit boards in an out of the storage units.

8. The method of claim 7, wherein a respective one of said robots is provided for each one of said storage units.

9. The method of claim 1, wherein said step (iii) includes storing the printed circuit boards in accordance with a width of each of the printed circuit boards.

10. The method of claim 3, wherein the bar codes include indications of a width of the respective printed circuit board, and wherein said step (iii) includes storing the printed circuit boards in accordance with the width of each of the printed circuit boards.

11. The method of claim 1, further including the step of displaying on a display terminal inserting positions of printed circuit boards which are delivered said step (vi).

12. The method of claim 1, wherein said step (iii) includes (a) placing at least one printed circuit board to be stored in a new carrying case, (b) moving the new carrying case to a storage part, (c) emptying the at least one printed circuit board from the new carrying case for storage, (d) returning an already present empty carrying case from a buffer toward an entry part of the automatic warehouse when such an already present empty carrying case is in the buffer, and (e) placing the new carrying case in the buffer after step (c).

13. The management system of claim 4, wherein said means for automatically storing the printed circuit boards in an automatic warehouse includes an entry part of the automatic warehouse, said entry part having (a) a board supporter which supports both sides of a printed circuit board from a lower side, (b) means for grasping a leading edge of a printed circuit board, and (c) means for moving said board supporter from a retracted stand-by position to a raised operative position.

14. The management system of claim 13, wherein said board supporter supports both sides of a printed circuit board from a lower side via a plurality of tapered rolls.

15. The management system of claim 13, wherein said entry part further includes a spring for contacting the leading edge of a printed circuit board so as to define a horizontal position of the printed circuit board on said entry part.

16. The management system of claim 6, wherein each of said identity code bar codes include indications of (i) a width of the respective printed circuit boards, (ii) lot numbers of parts on the respective printed circuit board, and (iii) the number of the respective printed circuit board.

* * * * *